United States Patent
Boenning et al.

(10) Patent No.: US 9,682,780 B2
(45) Date of Patent: Jun. 20, 2017

(54) AIRCRAFT MONUMENT COMPRISING AN INTEGRATED CABIN ATTENDANT SEAT AND AIRCRAFT AREA

(71) Applicant: Airbus Operations GmbH, Hamburg (DE)

(72) Inventors: Kenneth Boenning, Hamburg (DE); Jens Sorge, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 183 days.

(21) Appl. No.: 14/063,151

(22) Filed: Oct. 25, 2013

(65) Prior Publication Data

US 2014/0209741 A1 Jul. 31, 2014

Related U.S. Application Data

(60) Provisional application No. 61/718,736, filed on Oct. 26, 2012.

(30) Foreign Application Priority Data

Oct. 26, 2012 (EP) .................................. 12190208

(51) Int. Cl.
B64D 11/06 (2006.01)
B64D 11/04 (2006.01)

(52) U.S. Cl.
CPC .............. B64D 11/06 (2013.01); B64D 11/04 (2013.01); B64D 11/0691 (2014.12)

(58) Field of Classification Search
CPC . B64D 11/04; B64D 11/0627; B64D 11/0691; B64D 11/0698; B64D 11/0023;
(Continued)

(56) References Cited

U.S. PATENT DOCUMENTS 1,642,125 A * 9/1927 Nelson ............................ 297/14
1,723,511 A * 8/1929 Johnston ........................ 297/14
(Continued)

FOREIGN PATENT DOCUMENTS

DE 3634839 4/1988
DE 102008009938 9/2009
(Continued)

OTHER PUBLICATIONS

Chinese Search Report, May 22, 2015.
Chinese Search Report, Dec. 28, 2015.

*Primary Examiner* — Tien Dinh
*Assistant Examiner* — Christopher Hutchens
(74) *Attorney, Agent, or Firm* — Greer, Burns & Crain, Ltd.

(57) ABSTRACT

An aircraft monument comprising a first compartment and a cabin attendant seat having a backrest and a seat element. The seat element is movable relative to the backrest between a folded position, wherein a seat surface of the seat element extends substantially parallel to a backrest surface of the backrest, and an unfolded position, wherein the seat surface of the seat element extends substantially perpendicular to the backrest surface of the backrest. The cabin attendant seat is movable relative to the aircraft monument between a stowed position, wherein the cabin attendant seat, with the seat element being in its folded position, is received in the first compartment of the aircraft monument, and an operating position, wherein the cabin attendant seat is disposed outside of the first compartment of the aircraft monument in a position which allows the seat element to be moved into its unfolded position.

14 Claims, 9 Drawing Sheets

(58) Field of Classification Search
CPC ... B64D 11/06; B64D 11/0601; B64D 11/627; B64D 11/0639; B64D 11/064; B64D 11/0649
USPC ..... 297/14, 395, 403, 220, 397, 452.13, 483
See application file for complete search history.

(56) References Cited

U.S. PATENT DOCUMENTS

| | | | |
|---|---|---|---|
| 2,982,342 A * | 5/1961 | Liljengren | 297/299 |
| 3,369,842 A * | 2/1968 | Adams et al. | 297/483 |
| 3,594,037 A * | 7/1971 | Sherman | 297/14 |
| 4,799,632 A | 1/1989 | Baymak et al. | |
| 4,993,666 A * | 2/1991 | Baymak | B09B 1/00 244/122 R |
| 6,758,527 B2 * | 7/2004 | Schambre et al. | 297/395 |
| 8,757,719 B2 * | 6/2014 | Hayakawa | B60N 2/065 297/331 |
| 2002/0000490 A1 | 1/2002 | Angerami et al. | |
| 2007/0114819 A1 * | 5/2007 | Dougherty | 297/14 |
| 2008/0164710 A1 * | 7/2008 | Thomas et al. | 296/63 |
| 2009/0206200 A1 | 8/2009 | Bolder et al. | |
| 2012/0199695 A1 * | 8/2012 | Isherwood et al. | 244/118.6 |
| 2013/0126672 A1 | 5/2013 | Weitzel | |
| 2013/0313365 A1 | 11/2013 | Ehlers et al. | |
| 2014/0048650 A1 | 2/2014 | Schliwa et al. | |
| 2014/0166808 A1 * | 6/2014 | Boenning et al. | 244/118.6 |
| 2014/0224931 A1 | 8/2014 | Weitzel et al. | |
| 2014/0375086 A1 * | 12/2014 | Schliwa et al. | 297/14 |

FOREIGN PATENT DOCUMENTS

| | | |
|---|---|---|
| DE | 102011116519 | 4/2013 |
| DE | 102011116521 | 4/2013 |
| EP | 1127788 | 8/2001 |
| WO | 2012080135 | 6/2012 |
| WO | 2012110643 | 8/2012 |
| WO | 2012136327 | 10/2012 |

* cited by examiner

AIRCRAFT MONUMENT COMPRISING AN INTEGRATED CABIN ATTENDANT SEAT AND AIRCRAFT AREA

CROSS-REFERENCES TO RELATED APPLICATIONS

This application claims the benefit of the U.S. Provisional Application No. 61/718,736, filed on Oct. 26, 2012, and of the European patent application No. 12 190 208.4 filed on Oct. 26, 2012, the entire disclosures of which are incorporated herein by way of reference.

BACKGROUND OF THE INVENTION

The invention relates to an aircraft monument comprising an integrated cabin attendant seat. The invention further relates to an aircraft area, in particular an aircraft cabin area which is equipped with an aircraft monument comprising an integrated cabin attendant seat.

The passenger cabin of a modern aircraft typically is equipped with cabin attendant seats which may either be mounted to a wall of a monument installed in the aircraft passenger cabin as described in non-published DE 10 2011 116 521 or be attached to the floor of the aircraft passenger cabin as known from DE 10 2008 009 938 A1. Single cabin attendant seats provide seating for one cabin attendant, whereas double cabin attendant seats as disclosed, e.g., in DE 3 634 839 A1 may be occupied by two cabin attendants in a side by side or a back to back alignment. For short and middle range aircraft, standard cabin attendant seats provide a basic comfort level which accounts for the short time of usage during taxi, take-off and landing. For long range aircraft, high comfort cabin attendant seats are available which may additionally be used for rest periods during cruise. A cabin attendant seat comprising an integrated storage compartment for receiving emergency equipment such as, e.g., survival kits is described in non-published DE 10 2011 116 519.

SUMMARY OF THE INVENTION

The invention is directed at the object of providing an aircraft monument which reduces the cabin space requirement of a cabin attendant seat. The invention further is directed at the object of providing an aircraft area which is equipped with an aircraft monument of this kind.

An aircraft monument according to the invention comprises a first compartment and a cabin attendant seat having a back rest and seat element. The cabin attendant seat may be a single or a double cabin attendant seat. The seat element is movable relative to the backrest between a folded position and an unfolded position. When the seat element is in its folded position, a seat surface of the seat element extends substantially parallel to a backrest surface of the backrest and faces the backrest surface of the backrest. When the seat element is in its unfolded position, the seat surface of the seat element extends substantially perpendicular to the backrest surface of the backrest. With the seat element being disposed in its folded position, the cabin attendant seat has a particularly low space requirement. The cabin attendant seat may comprise a suitable biasing mechanism for biasing the seat element into its folded position. Preferably, the biasing force of the biasing mechanism is strong enough to retract the seat automatically after a cabin attendant has stood up, but low enough for an average person to dispose the seat element into the unfolded position using one hand and sitting down at the same time. Further, a locking mechanism may be provided which is adapted to lock the seat element in its unfolded position against the biasing force of the biasing mechanism. For safety reasons, such a locking mechanism, however, must be self-unlocking after the cabin attendant has stood up, such that the seat element is automatically retracted into its folded position so as to prevent the seat element from blocking a passageway to a door.

The cabin attendant seat is movable relative to the aircraft monument between a stowed position and an operating position. In its stowed position, the cabin attendant seat is received in the first compartment of the aircraft monument, wherein the seat element is in its folded position. In its operating position, the cabin attendant seat is disposed outside of the first compartment of the aircraft monument in a position which allows the seat element to be moved into its unfolded position. The aircraft monument according to the invention thus allows a cabin attendant seat to be stowed within the first compartment of the aircraft monument when not in use. When the cabin attendant seat is stowed within the first compartment of the aircraft monument, the seat element is in its folded position allowing the first compartment of the aircraft monument for receiving the cabin attendant seat in its stowed position to have a relatively small size.

The cabin attendant seat of the aircraft monument according to the invention does not require cabin space when it is in its stowed position. Instead, the cabin attendant seat may be moved into its operating position only when it is in fact in use during taxi, take-off and landing. The aircraft monument according to the invention thus is particularly advantageous for use in short and middle range aircraft, where the cabin attendant seats remain unused for almost the entire flight. In an aircraft equipped with the aircraft monument according to the invention, the cabin space which is occupied by the cabin attendant seat when the cabin attendant seat is in use, after storing the cabin attendant seat within the first compartment of the aircraft monument, can be used for other purposes. No additional cabin space is required for the aircraft attendant seat, if the cabin space required by the cabin attendant seat in use has to remain clear of other equipment anyway, since this cabin space is required for other purposes (e.g., trolley handling) when the cabin attendant seat is stowed within the first compartment of the aircraft monument. In addition, it is no longer necessary for the cabin crew to check during the flight that the cabin attendant seat is not used by passengers, although they are not allowed to. Finally, the aircraft monument according to the invention has a positive impact on cabin interior design, because the cabin attendant seat is not visible when stowed within the first compartment of the aircraft monument.

Preferably, the cabin attendant seat, when being positioned in its operating position, is connected to in the aircraft monument in a load transmitting manner. Typically, cabin attendant seats have to fulfill certain load bearing requirements, i.e., the cabin attendant seats must be capable of withstanding certain static and dynamic loads. Therefore, prior art cabin attendant seats usually are provided with a support structure which is mounted to the floor of the aircraft cabin and which is capable of directing loads applied onto the cabin attendant seat into the aircraft structure. When the cabin attendant seat in its operating position is connected to the aircraft monument in a load transmitting manner, the aircraft monument may be used to direct loads applied onto the cabin attendant seat into the aircraft structure. In other words, the aircraft monument may serve at least as an additional support structure for the cabin attendant seat allowing the support structure of the cabin attendant seat to be designed less strong and hence more lightweight.

The aircraft monument may comprise a first sliding mechanism. The first sliding mechanism may allow the cabin attendant seat, upon being moved between its stowed position and its operating position, to be slid out of the first compartment or into the first compartment. The first sliding mechanism may, for example, comprise a guide rail system allowing a guided sliding movement of the cabin attendant seat relative to the first compartment. Alternatively or additionally thereto, the first sliding mechanism may comprise at least one roller simplifying the movement of the cabin attendant seat relative to the first compartment.

The aircraft monument according to the invention may further comprise a first pivoting mechanism which allows the cabin attendant seat, upon being moved between its stowed position and its operating position, to be pivoted relative to the aircraft monument. The first pivoting mechanism may, for example, comprise at least one hinge-joint which may, for example, be connected to the cabin attendant seat and the aircraft monument such that the cabin attendant seat, upon being moved from its stowed position into its operating position, may be pivoted relative to the aircraft monument after being slid out of the first compartment with the aid of the first sliding mechanism. The cabin attendant seat thus may have different orientations relative to the aircraft monument in its stowed position and its operating position allowing the space within the aircraft monument to be used in a particularly efficient manner.

A pivoting axis about which the cabin attendant seat is pivotable upon being moved between its stowed position and its operating position may extend in a region of a side surface or in the region of an upper surface of the backrest of the cabin attendant seat. The term "side surface" in the context of the present application should designate a surface of the backrest of the cabin attendant seat which, when the cabin attendant seat is in its operating position and ready to be used, extends between side edges of the backrest surface and a rear surface of the backrest. The term "upper surface" in the context of the present application should designate a surface of the backrest of the cabin attendant seat which, when the cabin attendant seat is in its operating position and ready to be used, extends between upper edges of the backrest surface and the rear surface of the backrest. When the cabin attendant seat is pivotable about a pivoting axis extending in a region of a side surface of the backrest of the cabin attendant seat, the cabin attendant seat may be stowed in the first compartment of the aircraft monument in an "upright" position. To the contrary, a cabin attendant seat which is pivotable about a pivoting axis extending in a region of an upper surface of the backrest of the cabin attendant seat may be stowed in the first compartment of the aircraft monument in a "lying" position.

When the cabin attendant seat is disposed in its operating position, the backrest surface of the backrest preferably extends substantially parallel to a front surface of the aircraft monument. This allows a minimization of the cabin space requirement of the cabin attendant seat when being disposed in its operating position. In addition, a load transmitting connection between the cabin attendant seat and the aircraft monument which allows the aircraft monument to serve at least as an additional supporting structure for the cabin attendant seat may be provided relatively easily. It is, however, also conceivable that the cabin attendant seat, when being disposed in its operating position, is oriented relative to the aircraft monument such that the backrest surface of the backrest extends substantially perpendicular to the front surface of the aircraft monument. This orientation of the cabin attendant seat may, for example, be advantageous in case a double cabin attendant seat should be integrated into the aircraft monument which, in its operating position, should be positioned in a back to back alignment.

The aircraft monument according to the invention may further comprise a locking mechanism for locking the cabin attendant seat in its operating position. Preferably, the locking mechanism comprises a first locking element which is provided on the cabin attendant seat and a second locking element which is formed complementary to the first locking element and which is provided in the region of a side surface or in the region of a front surface of the aircraft monument. A second locking element which is provided in the region of a side surface of the aircraft monument is particularly suitable for interacting with a first locking element provided on a cabin attendant seat which is pivotable about a pivoting axis extending in a region of a side surface of the backrest of the cabin attendant seat. A second locking element which is provided in the region of the front surface of the aircraft monument is particularly suitable for interacting with a first locking element which is provided on a cabin attendant seat which is pivotable about a pivoting axis extending in the region of an upper surface of the backrest of the cabin attendant seat. The locking mechanism may be any locking mechanism which is suitable to secure the cabin attendant seat in its operating position and may, for example, be of a self-locking snap type. The locking mechanism may fulfill the double function of securing the cabin attendant seat in its operating position and securing the seat element of the cabin attendant seat in its unfolded position. For safety reasons, the locking mechanism for locking the seat element of the cabin attendant seat in its unfolded position, however, must be self-unlocking after the cabin attendant has stood up, such that the seat element is automatically retracted into its folded position so as to prevent the seat element from blocking a passageway to a door.

The aircraft monument according to the invention may further comprise a second compartment and a neck rest which is movable relative to the aircraft monument between a stowed position, wherein the neck rest is received in the second compartment of the aircraft monument, and an operating position, wherein the neck rest is disposed outside of the second compartment of the aircraft monument. When the neck rest is disposed in its operating position, a neck rest surface of the neck rest and the backrest surface of the backrest of the cabin attendant seat being positioned in its operating position preferably extend substantially co-planar. In other words, when both the neck rest and the cabin attendant seat are positioned in their operating positions, the neck rest surface of the neck rest and the backrest surface of the backrest of the cabin attendant seat extend substantially co-planar such that the neck rest is suitable to support the head of a cabin crew member sitting on the cabin attendant seat. The neck rest may be a combined neck- and head rest that may be used to rest both neck and head of the cabin attendant.

The aircraft monument may further comprise a second sliding mechanism allowing the neck rest, upon being moved between its stowed position and its operating position, to be slid out of the second compartment or into the second compartment. Like the first sliding mechanism, the second sliding mechanism may also comprise a guide rail system and/or a roller system allowing the neck rest to be moved between its stowed position and its operating position in a comfortable manner.

The aircraft monument may further comprise a second pivoting mechanism allowing the neck rest, upon being moved between its stowed position and its operating position, to be pivoted relative to the aircraft monument. Similar to the first pivoting mechanism, also the second pivoting mechanism may comprise at least one hinge joint which is fastened to the neck rest and the aircraft monument.

A pivoting axis about which the neck rest is pivotable upon being moved between its stowed position and its operating position may extend in a region of a lower surface of the neck rest. The term "lower surface" in the context of the present application should designate a surface of the neck rest which, when the neck rest is in its operating position and ready to be used, extends between lower edges of the neck rest surface and a rear surface of the neck rest. A neck rest which is pivotable about a pivoting axis extending in a region of a lower surface of the neck rest, upon being moved from its stowed position into its operating position, may be pivotable either upwards or downwards relative to the front surface of the aircraft monument. The pivoting axis about which the neck rest is pivotable upon being moved between its stowed position and its operating position may, however, also extend in a region of a side surface of the neck rest.

The orientation of the neck rest relative to the aircraft monument in its operating position preferably is adapted to the orientation of the cabin attendant seat relative to the aircraft monument in its operating position. In case a backrest surface of the cabin attendant seat being disposed in its operating position extends substantially perpendicular to the front surface of the aircraft monument, preferably also the neck rest surface of the neck rest being disposed in its operating position extends substantially perpendicular to the front surface of the aircraft monument. A neck rest which is intended for use together with a cabin attendant seat, the backrest surface of which extends substantially parallel to the front surface of the aircraft monument when the cabin attendant seat is disposed in its operating position, however, preferably also has a neck rest surface which extends substantially parallel to the front surface of the aircraft monument when the neck rest is disposed in its operating position.

The aircraft monument may further comprise an additional backrest cushioning which may be provided in a region of the front surface of the aircraft monument. Preferably, the additional backrest cushioning is positioned so as to provide for an enlargement of the backrest of the cabin attendant seat, when the cabin attendant seat is disposed in its operating position. For example, the additional backrest cushioning may be provided in a region of the front surface of the aircraft monument which extends between the backrest of the cabin attendant seat being disposed in its operating position and the neck rest being disposed in its operating position. The additional backrest cushioning enhances the comfort of the cabin attendant seat. Further, the additional backrest cushioning reduces the risk of injury of the shoulder area of the cabin attendant, e.g., in case of strong turbulence or during the impact phase of an emergency landing.

The aircraft monument according to the invention may further comprise a restraint system which is fastened to the aircraft monument. Loads applied to the restraint system then may at least partially be transmitted to the aircraft monument. The restraint system may at least partially be directly attached to a front surface of the aircraft monument and not stowed in any compartment. It is, however, also conceivable that the restraint system at least partially is received in the first or the second compartment when the cabin attendant seat or the neck rest is disposed in its stowed position. Further, it is conceivable that parts of the restraint system, e.g., a shoulder harness and a lap belt, are stored in different compartments of the aircraft monument. The restraint system may, however, be exposed when the cabin attendant seat or the neck rest is moved into its operating position. In general, it is conceivable that the restraint system has to be manually removed from the first or the second compartment prior to being used. Preferably, the restraint system, however, is stowed in the first or the second compartment in such a manner that the restraint system is automatically exposed upon moving the cabin attendant seat or the neck rest into its operating position.

The aircraft monument according to the invention preferably is a galley. The cabin attendant seat then may, for example, be integrated into a trolley separator or another compartment of the galley. In case a trolley separator receives the cabin attendant seat in its stowed position, the trolley separator may be suitably modified, in particular enlarged, so as to provide enough space for receiving the cabin attendant seat in its stowed position. The integration of a cabin attendant seat into a galley is particularly advantageous in view of a particularly efficient use of the cabin space, since the area in front of a galley during use of the galley has to remain clear to ensure trolley handling without difficulty. During taxi, take-off and landing, this cabin space, however, is not required and thus can be used for the cabin attendant seat. In addition, a cabin attendant seat which is provided in the region of a front surface of a galley is located close to the main aisle of the aircraft cabin in a single aisle aircraft or close to one of the aisles in a twin aisle aircraft which increases visibility of the aisle and the passenger seats. The cabin attendant seat thus provides direct view of almost the entire cabin. Finally, emergency equipment which should be stored as close to the cabin attendant seat as possible can be stored in a compartment of the galley ensuring that the emergency equipment, in case of an emergency, is easily accessible.

An aircraft area according to the invention comprises a passageway and an aircraft monument with an integrated cabin attendant seat as described above. The front surface of the aircraft monument faces the passageway. Further, an assist space is present, which extends over a part of the length of the aircraft monument in the direction of the passageway between the door surface of the aircraft monument and the passageway. Further, the assist space is arranged between an aircraft door and the cabin attendant seat, when the cabin attendant seat is disposed in its operating position. The aircraft area according to the invention uses the cabin space in a particularly efficient manner.

BRIEF DESCRIPTION OF THE DRAWINGS

Preferred embodiments of the invention now are described in more detail with reference to the appended schematic drawings, wherein.

DETAILED DESCRIPTION OF THE PREFERRED EMBODIMENTS

Figure 1:
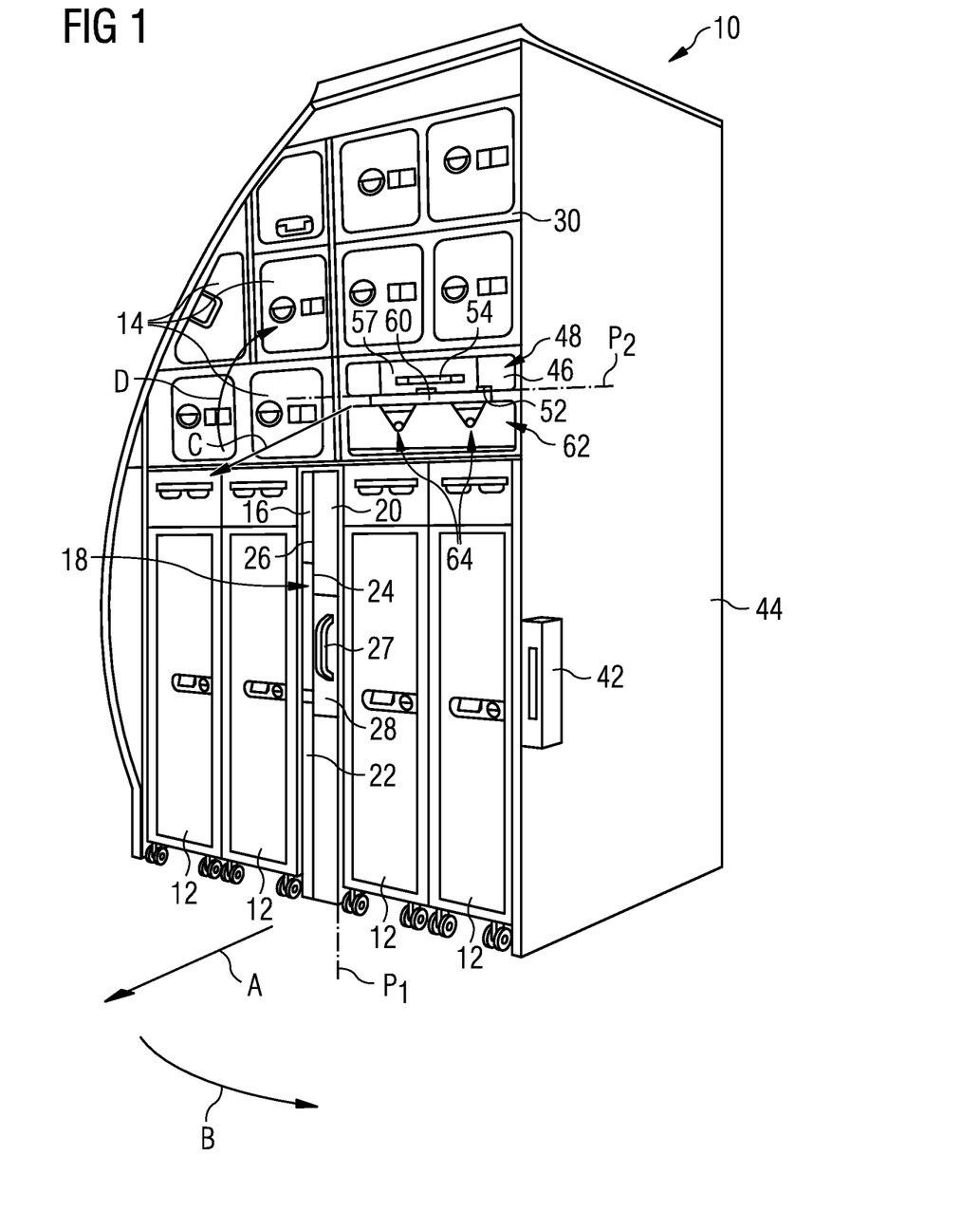
FIG. 1 shows a first embodiment of an aircraft monument with an integrated cabin attendant seat, wherein the cabin attendant seat is disposed in its stowed position.

FIG. 1 shows an aircraft monument 10 which is intended to be mounted in the passenger cabin of an aircraft. The aircraft monument 10 is designed in the form of a galley and comprises a plurality of compartments for receiving, for example, trolleys 12 or inserts 14 which may, for example, be loaded with food to be supplied to the passengers on board the aircraft. One of the inserts 14 of the aircraft monument 10 may also be used to store emergency equipment. A first compartment 16 of the aircraft monument 10, however, serves to receive an integrated cabin attendant seat 18.

Figure 2:
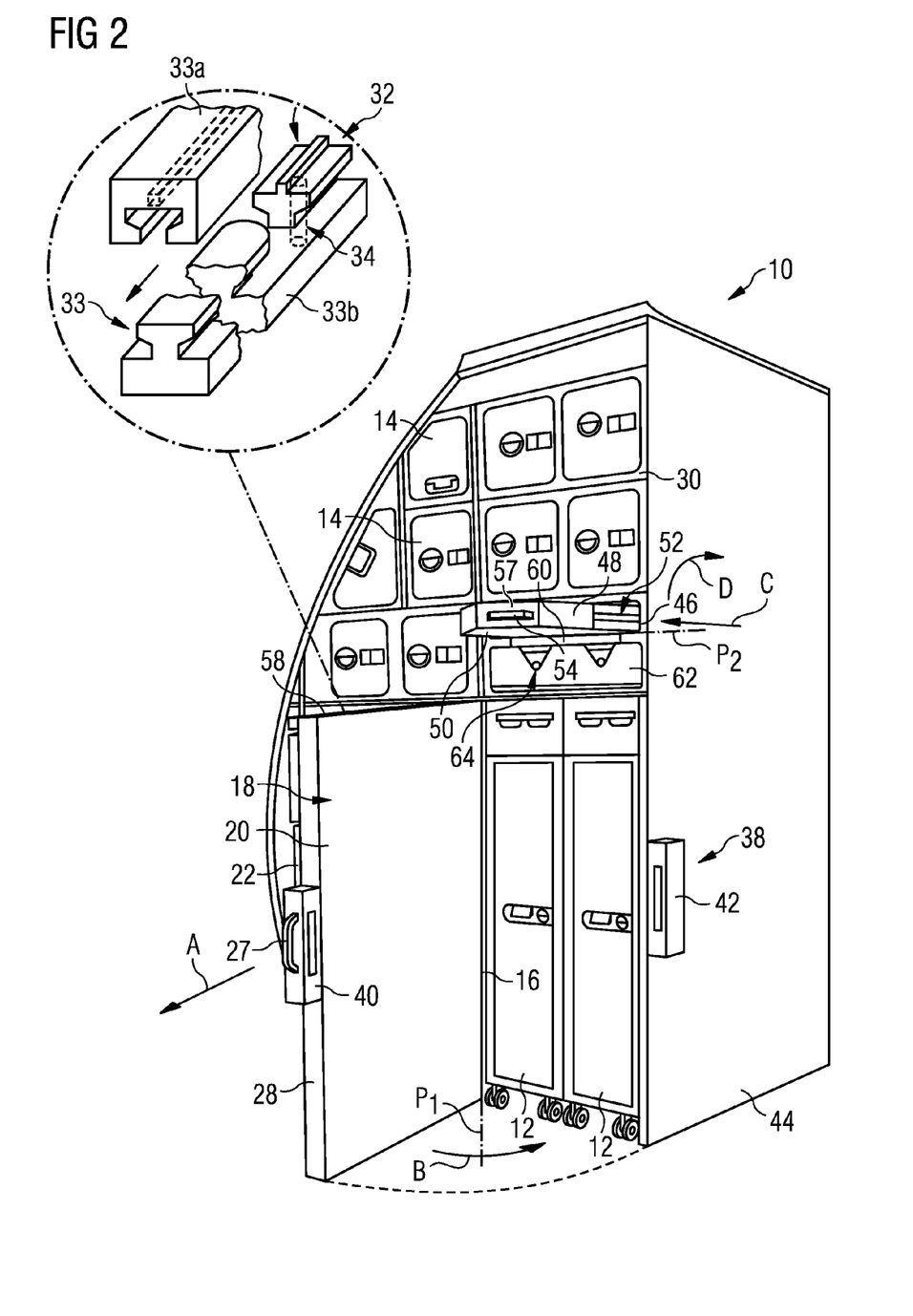
FIG. 2 shows the aircraft monument according to FIG. 1, wherein the cabin attendant seat is in the process of being moved from its stowed position into its operating position.
Figure 3:
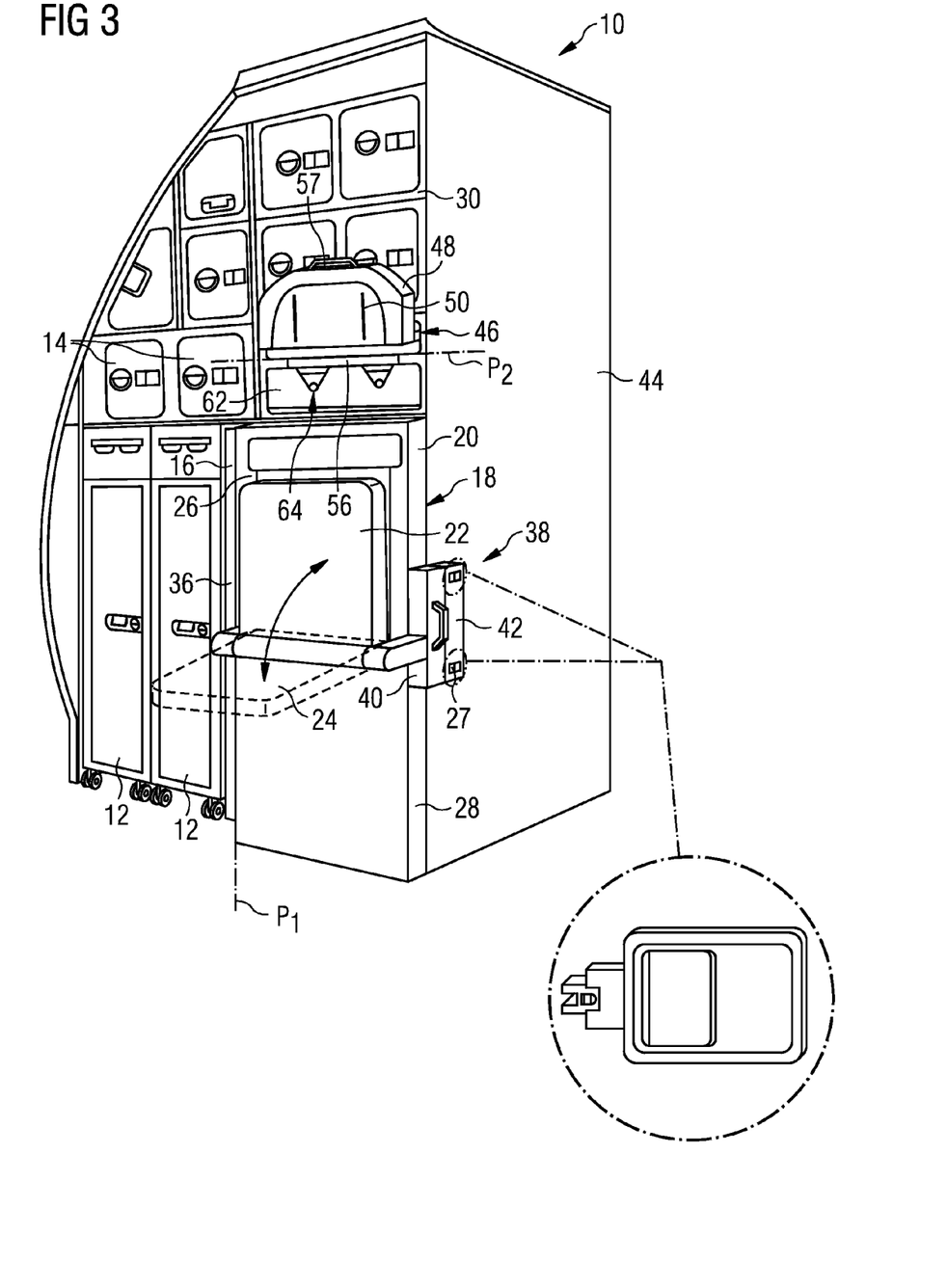
FIG. 3 shows the aircraft monument according to FIG. 1, wherein the cabin attendant seat is disposed in its operating position with a seat element being in its folded position.
Figure 4:
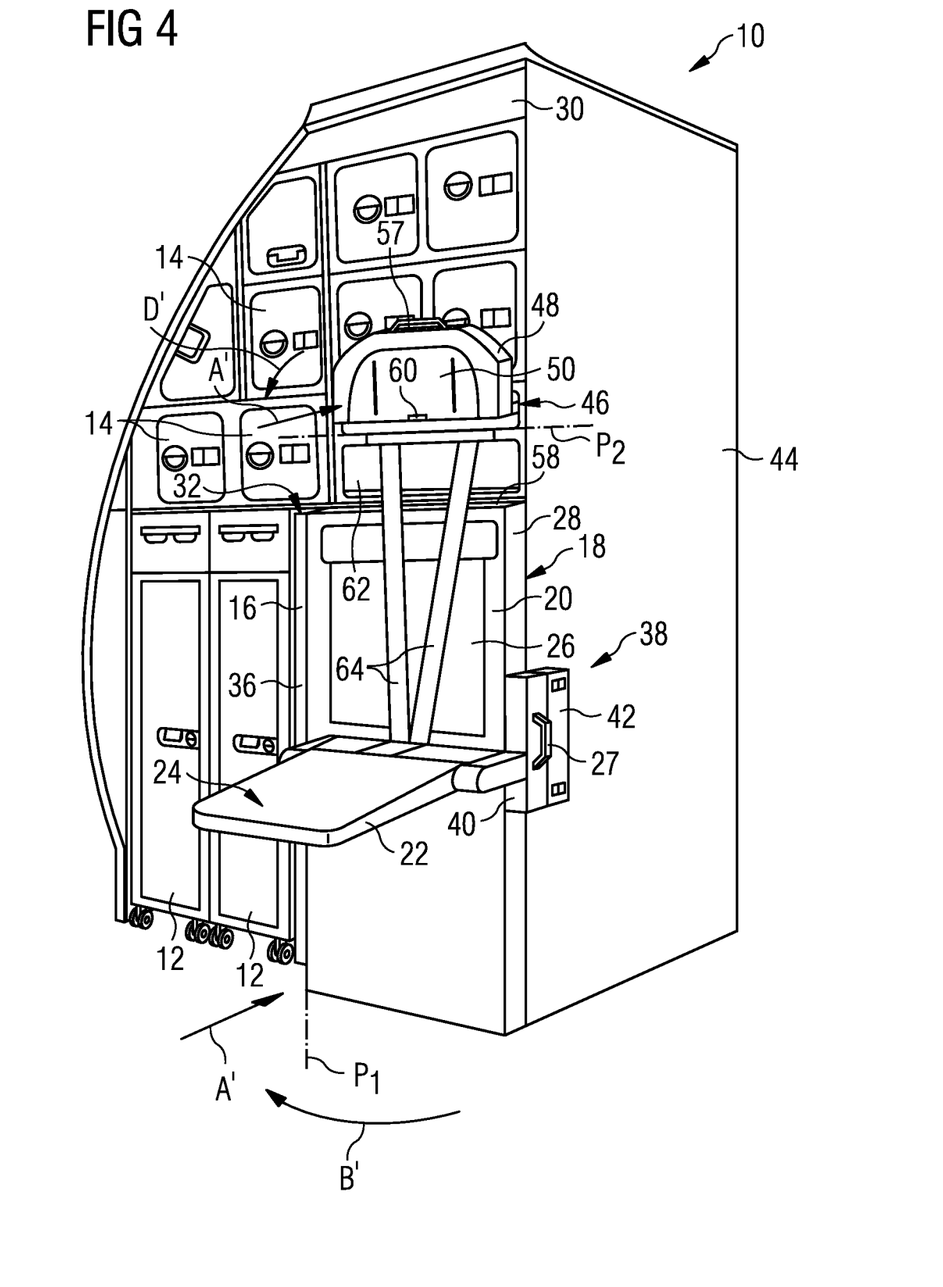
FIG. 4 shows the aircraft monument according to FIG. 1, wherein the cabin attendant seat is disposed in its operating position with a cabin attendant assumed to be sitting or a locking mechanism of a seat element locked.
Figure 5:
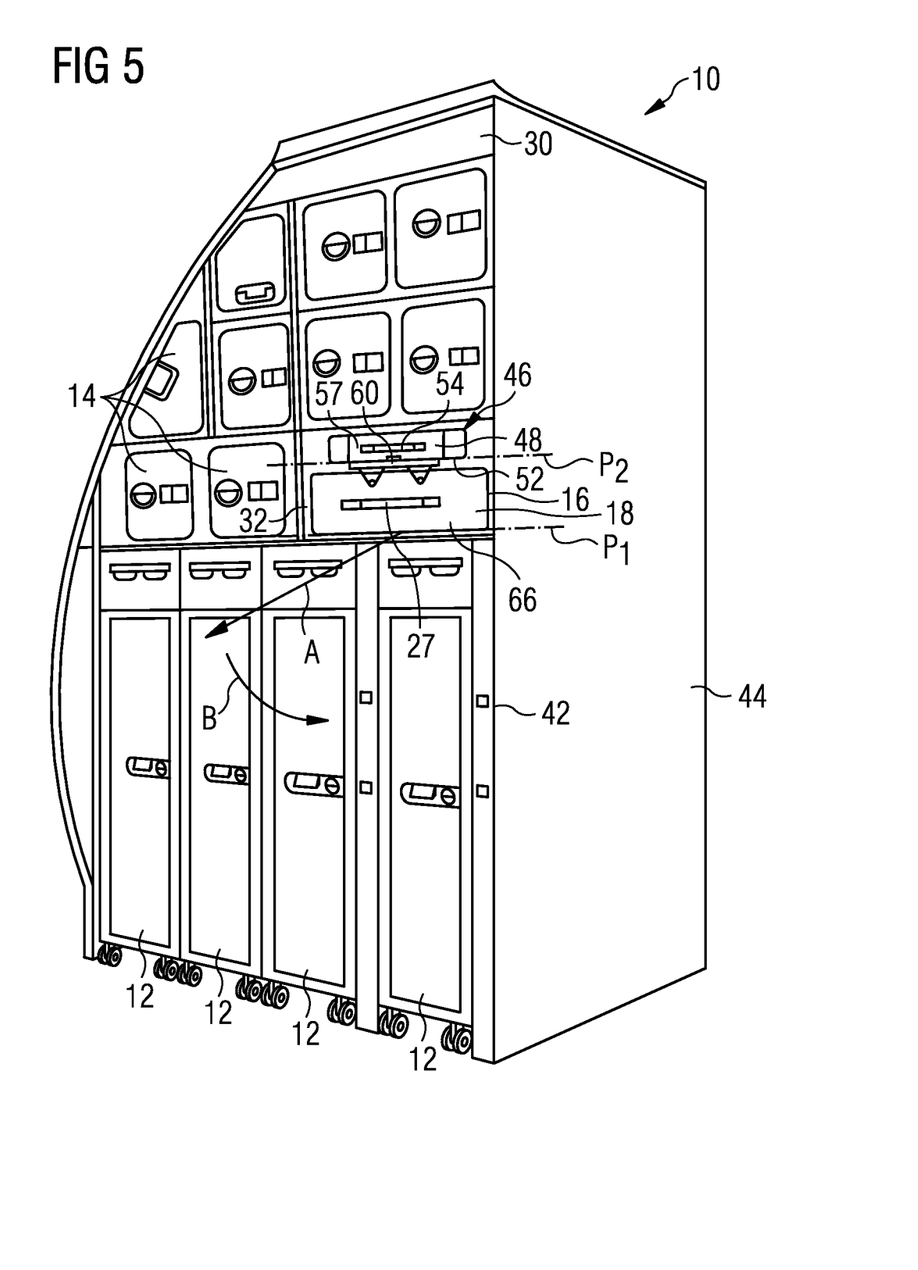
FIG. 5 shows a second embodiment of an aircraft monument with an integrated cabin attendant seat, wherein the cabin attendant seat is disposed in its stowed position.

As becomes apparent from FIGS. 2 to 4, the cabin attendant seat 18 comprises a backrest 20 and a seat element 22. The seat element 22 is movable relative to the backrest 20 between a folded position and an unfolded position, see FIG. 3. When the seat element 22 is in its folded position, a seat surface 24 of the seat element 22 extends substantially parallel to a backrest surface 26 of the backrest. When the seat element 22 is in its unfolded position, the seat surface 24 of the seat element 22 extends substantially perpendicular to the backrest surface 26 of the backrest 20. The cabin attendant seat 18 comprises a biasing mechanism (not shown) which serves to bias the seat element 22 into its folded position.

As shown in FIG. 1, the cabin attendant seat 18, with the seat element 22 being in its folded position, may be stowed in the first compartment 16 of the aircraft monument 10. In the embodiment of an aircraft monument 10 shown in FIG. 1, the first compartment 16 is formed by an enlarged trolley separator which receives the cabin attendant seat 18 in an "upright" position. A handle 27 is attached to a side surface 28 of the backrest 20 of the cabin attendant seat 18, the side surface 28 extending substantially co-planar to a front surface 30 of the aircraft monument 10 when the cabin attendant seat is received within the first compartment 16.

The cabin attendant seat 18 is movable from its stowed position depicted in FIG. 1 into an operating position depicted in FIG. 4. In its operating position, the cabin attendant seat 18 is disposed outside of the first compartment 16 of the aircraft monument 10 in a position which allows the seat element 22 to be moved into its unfolded position, see FIG. 3. To move the cabin attendant seat 18 from its stowed position into its operating position, with aid of a first sliding mechanism 32, the cabin attendant seat 18 is slid out of the first compartment 16 in the direction of an arrow A, see FIG. 2. Specifically, a user may grip the handle 27 and pull the cabin attendant seat 18 out of the first compartment 16. The first sliding mechanism 32, which comprises a guide rail system 33 with a first guide rail 33a mounted to the aircraft monument 10 and a second guide rail 33b mounted to an upper surface 58 of the backrest 20, ensures a smooth sliding movement of the cabin attendant seat 18 relative to the first compartment 16.

When the cabin attendant seat 18 has been slid out of the first compartment 16, the backrest 20 of the cabin attendant seat 18 extends substantially perpendicular to the front surface 30 of the aircraft monument, see FIG. 2. A pivoting mechanism 34 (which in the detailed view in FIG. 2 is shown in a schematic manner) comprises a plurality of hinge joints attached to the aircraft monument 10 and the cabin attendant seat 18. The pivoting mechanism 34 allows the cabin attendant seat 18 to be pivoted relative to the aircraft monument 10 in the direction of an arrow B. In the embodiment of an aircraft monument 10 according to FIGS. 1 to 4, a pivoting axis P1 about which the cabin attendant seat 18 is pivotable relative to the aircraft monument 10 thus extends in the region of a side surface 36 of the cabin attendant seat 18.

When the cabin attendant seat 18 is disposed in its operating position according to FIGS. 3 and 4, the backrest surface 26 of the backrest 20 extends substantially parallel to the front surface 30 of the aircraft monument 10. The cabin attendant seat 18 may be locked in its operating position by means of a locking mechanism 38. The locking mechanism 38 comprises a first locking element 40 which is provided on the cabin attendant seat 18 and a second locking element 42. The second locking element 42 is formed complementary to the first locking element 40 and is provided in the region of a side surface 44 of the aircraft monument 10. The locking mechanism 38 also serves to lock the seat element 22 in its unfolded position. For safety reasons, the locking mechanism 38 for locking the seat element 22 in its unfolded position is self-unlocking after the cabin attendant has stood up, such that the seat element 22 is automatically retracted into its folded position so as to prevent the seat element 22 from blocking a passageway to a door.

The aircraft monument 10 further comprises a second compartment 46. The second compartment 46 serves to receive a neck rest 48. The neck rest 48, like the cabin attendant seat 18, is movable relative to the aircraft monument 10 between a stowed position, wherein the neck rest 48 is received in the second compartment 46 of the aircraft monument 10, see FIG. 1, and an operating position, wherein the neck rest 48 is disposed outside of the second compartment 46 of the aircraft monument 10. When the neck rest 48 is in its operating position according to FIGS. 3 and 4, a neck rest surface 50 of the neck rest 48 extends substantially co-planar with the backrest surface 26 of the backrest 20 of the cabin attendant seat 18 being disposed in its operating position and substantially parallel to the front surface 30 of the aircraft monument 10.

A second sliding mechanism 52 (which in FIGS. 1 to 4 is shown in a schematic manner only) comprises a guide rail system 53 with a with first guide rails 53a mounted to the aircraft monument 10 and second guide rails 53b mounted to side faces of the neck rest 48 (see also FIG. 6) and allows the neck rest 48, upon being moved from its stowed position into its operating position, to be slid out of the second compartment 46 in the direction of an arrow C. To simplify handling of the neck rest 48, a further handle 54 is provided in the region of an upper surface 57 of the neck rest 48, i.e., a surface of the neck rest 48, which, when the neck rest 48 is in its operating position, face away from the upper surface 58 of the backrest 20 of the cabin attendant seat 18. To move the neck rest 48 from its stowed position into its operating position, a user thus can grip the further handle 54 and pull the neck rest 48 out of the second compartment 46.

Thereafter, by means of a second pivoting mechanism 60 (which in the detailed view in FIG. 2 is shown in a schematic manner), the neck rest 48 can be folded upwards relative to the front surface 30 of the aircraft monument 10 in the direction of an arrow D. The second pivoting mechanism 60, like the first pivoting mechanism 34, comprises a plurality of hinge-joints which are attached to the aircraft monument 10 and the neck rest 48. In the embodiment of an aircraft monument 10 shown in the drawings the neck rest 48 maintains in its operating position without an additional locking mechanism being present. If desired, it is, however, conceivable to provide an additional locking mechanism which serves to secure the neck rest 48 in its operating position.

An additional backrest cushioning 62 is provided in a region of the front surface 30 of the aircraft monument so as to provide for an enlargement of the backrest 20 of the cabin attendant seat 18, when the cabin attendant seat 18 is disposed in its operating position. In particular, the additional backrest cushioning 62 is disposed below the second compartment 46 such that the additional backrest cushioning 62 extends between the neck rest 48 in its operating position and the backrest 20 of the cabin attendant seat 18 in its operating position.

A restraint system 64 is received in the second compartment 46 when the neck rest 48 also is stowed in the second compartment 46. The restraint system 64 is automatically exposed when the neck rest 48 is slid out of the second compartment 46. In the embodiment of an aircraft monument 10 shown in the drawings, the restraint system 64 is received in the second compartment 46 below the neck rest 48 and thus is automatically pulled out of the second compartment 46 when the neck rest 48 is pulled out of the second compartment 46 and pivoted in the direction of the arrow C.

The first compartment 16 and/or the second compartment 46 may be provided with a cover, for example in the form of a flap (not shown) which serves to close the first compartment 16 and/or the second compartment 46, either in case the attendant seat 18 and/or the neck rest 48 is/are in its/their stowed position or in case the attendant seat 18 and/or the neck rest 48 is/are in its/their operating position. This allows maintaining an attractive interior design of the galley independent of whether cabin attendant seat 18 and/or the neck rest 48 is/are in its/their stowed position or its/their operating position.

Due to the biasing force applied by the biasing mechanism, the seat element 22 automatically is moved back into its folded position after a cabin attendant has stood up. Further, to move the cabin attendant seat 18 back from its operation position into its stowed position, the locking mechanism 38 is unlocked, allowing the cabin attendant seat 18 to be pivoted about the pivoting axis P1 in the direction of an arrow B' such that the backrest 20 of the cabin attendant seat 18 again extends substantially perpendicular to the front surface 30 of the aircraft monument and the cabin attendant seat 18 is aligned with the first compartment 16. Finally, the cabin attendant seat 18 is pushed back into the first compartment 16 in the direction of an arrow A', see FIG. 4.

Similarly, to move the neck rest 48 from its operating position back into its stowed position, the neck rest 48 is pivoted about the pivoting axis P2 in the direction of an arrow D'. Thereafter, the neck rest 48, together with the restraint system 46 is pushed back into the second compartment 46 in the direction of an arrow A', see FIG. 4.

The aircraft monument 10 depicted in FIGS. 5 to 8 differs from the arrangement according to FIGS. 1 to 4 in that the pivoting axis P1 about which the cabin attendant seat 18 is pivotable upon being moved between its stowed position and its operating position no longer extends in the region of the side surface 46 of the cabin attendant seat 18, but in the region of the upper surface 58 of the backrest 20 of the cabin attendant seat 18. The cabin attendant seat 18 thus can be stowed within the first compartment 16 in a "lying" position. Further, the handle 27 which may be gripped by a user upon pulling the cabin attendant seat 18 out of the first compartment 16 no longer is attached to a side surface 28, but to a lower surface 66 of the backrest 20 of the cabin attendant seat 18. Finally, the second locking element 42 of the locking mechanism 38 no longer is provided in the region of the side surface 44 of the aircraft monument 10, but in the region of the front surface 30 of the aircraft monument 10 so as to interact with a complementary first locking element 40 provided on the cabin attendant seat 18.

Figure 6:
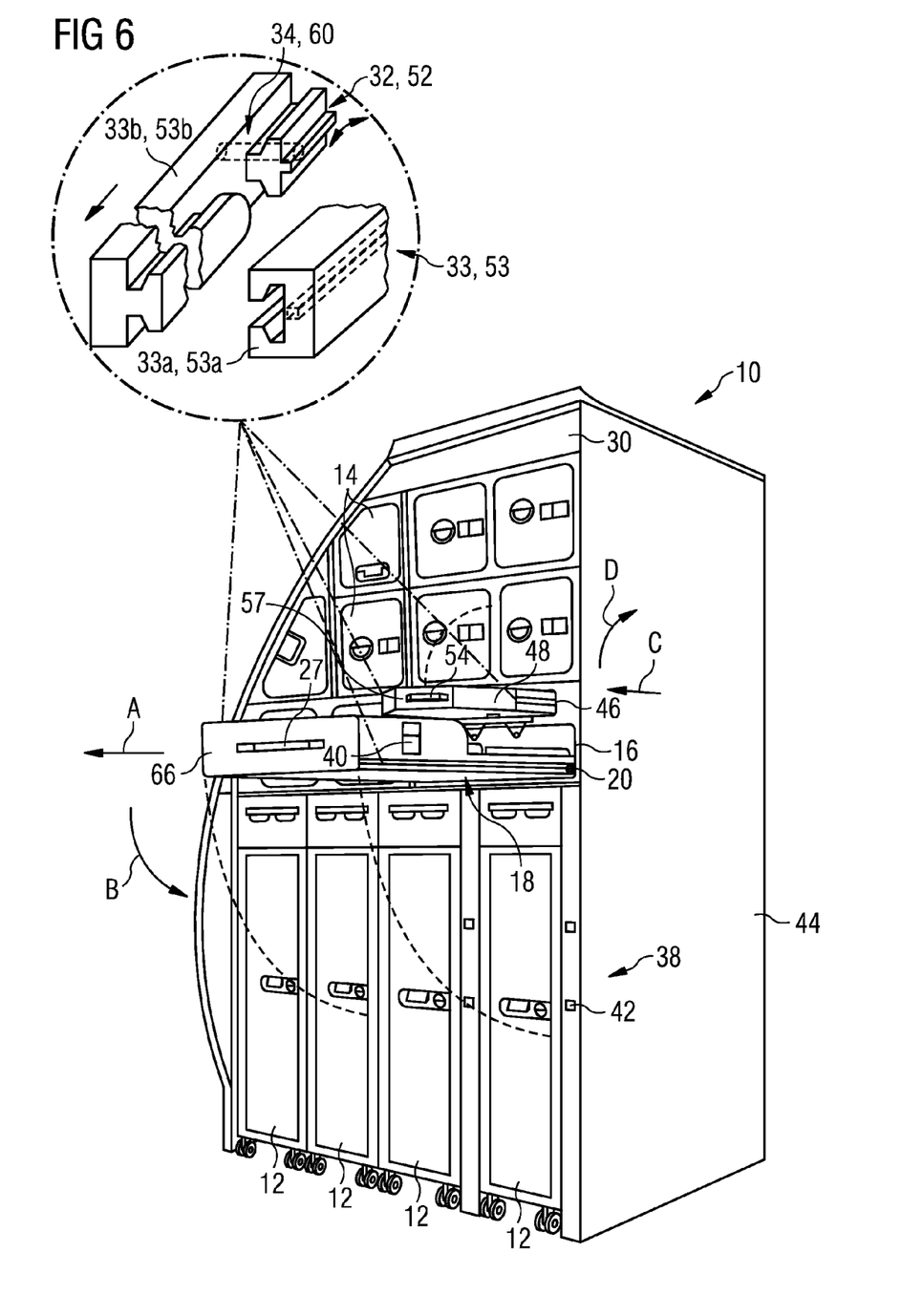
FIG. 6 shows the aircraft monument according to FIG. 5, wherein the cabin attendant seat is in the process of being moved from its stowed position into its operating position.
Figure 7:
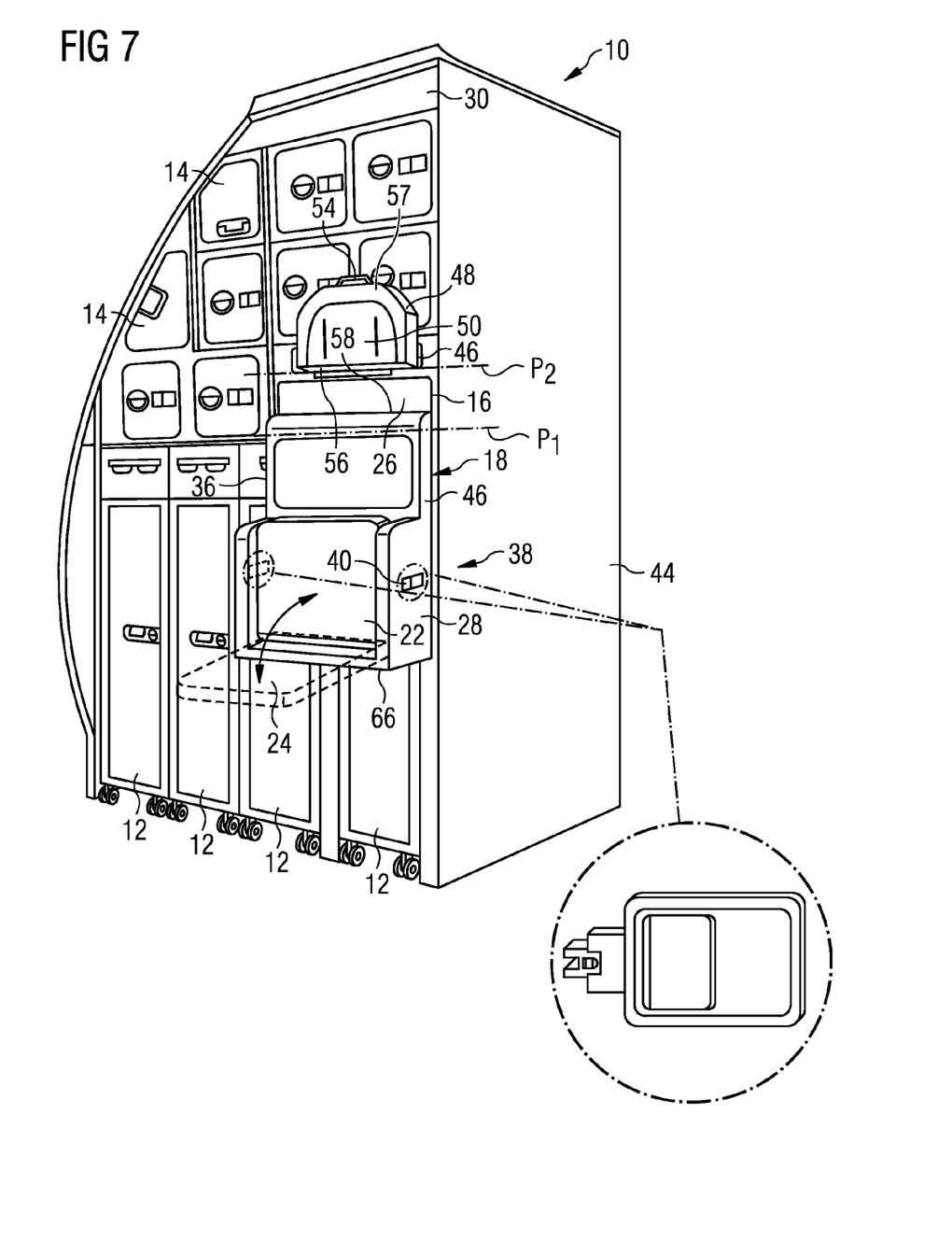
FIG. 7 shows the aircraft monument according to FIG. 5, wherein the cabin attendant seat is disposed in its operating position with a seat element being in its folded position.
Figure 8:
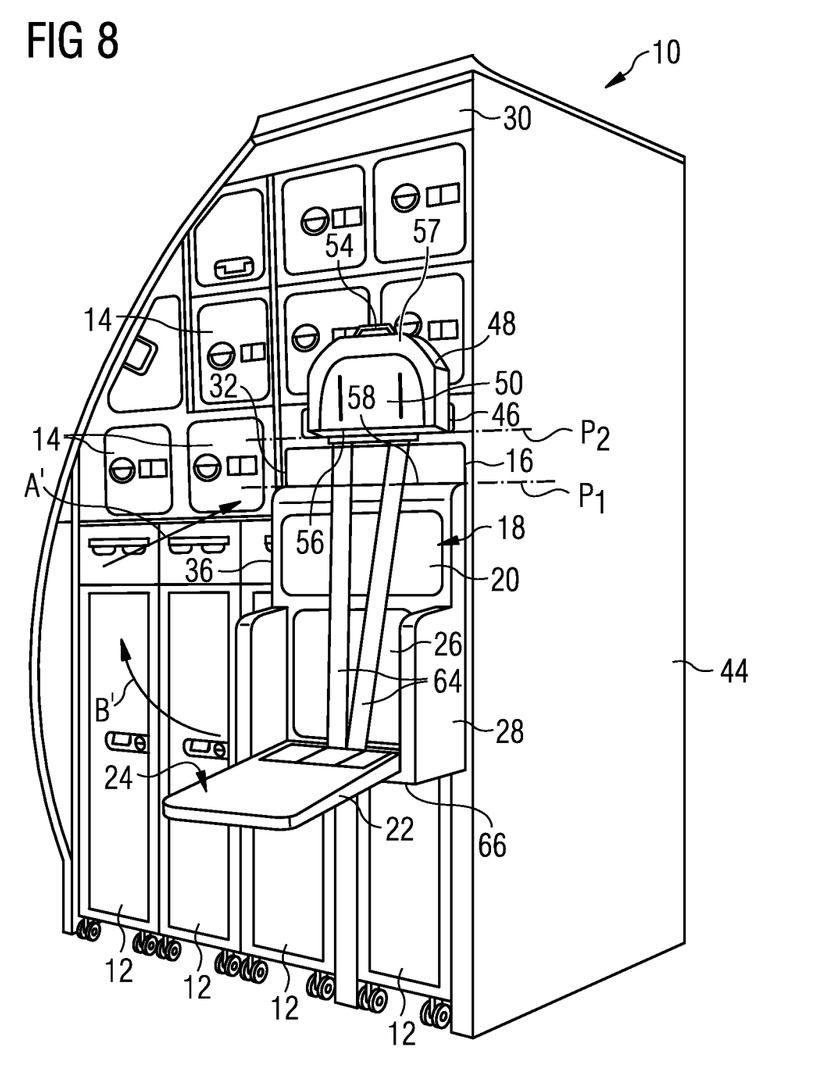
FIG. 8 shows the aircraft monument of FIG. 5, wherein the cabin attendant seat is disposed in its operating position with a cabin attendant assumed to be sitting or a locking mechanism of a seat element locked.

To move the cabin attendant seat 18 from its stowed position into its operating position, with aid of the first sliding mechanism 32, the cabin attendant seat 18 is slid out of the first compartment 16 in the direction of the arrow A. The first sliding mechanism 32 comprises a guide rail system 33 with two first guide rails 33a mounted to the aircraft monument 10 and a second guide rail 33b mounted to side faces 28, 36 of the backrest 20, see FIG. 6. When the cabin attendant seat 18 has been slid out of the first compartment 16, the backrest 20 of the cabin attendant seat 18 extends substantially perpendicular to the front surface 30 of the aircraft monument. The pivoting mechanism 34 (which in the detailed view in FIG. 6 is shown in a schematic manner) thereafter allows the cabin attendant seat 18 to be pivoted downwards relative to the aircraft monument 10 in the direction of an arrow B.

Due to the biasing force applied by the biasing mechanism, the seat element 22 automatically is moved back into its folded position after a cabin attendant has stood up. Further, to move the cabin attendant seat 18 back from its operation position into its stowed position, the locking mechanism 38 is unlocked, allowing the cabin attendant seat 18 to be pivoted about the pivoting axis P1 upwards relative to the aircraft monument 10 in the direction of an arrow B' such that the backrest 20 of the cabin attendant seat 18 again extends substantially perpendicular to the front surface 30 of the aircraft monument and the cabin attendant seat 18 is aligned with the first compartment 16. Finally, the cabin attendant seat 18 is pushed back into the first compartment 16 in the direction of an arrow A'.

Otherwise, the structure and the function of the aircraft monument 10 according to FIGS. 3 and 4 correspond to the structure and the function of the aircraft monument 10 depicted in FIGS. 1 and 2.

Figure 9:
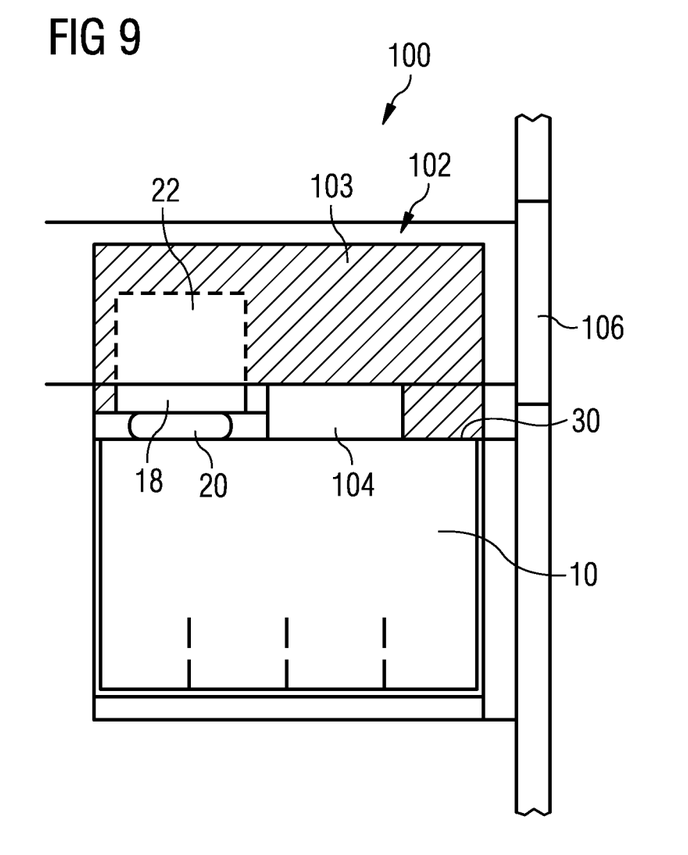
FIG. 9 shows a top view of an aircraft area equipped with an aircraft monument with an integrated cabin attendant seat.

FIG. 9 shows an aircraft area 100 which is equipped with an aircraft monument 10 according to any one of FIGS. 1 to 8. The aircraft area 100 comprises a passageway 102. The front surface 30 of the aircraft monument 10 faces the passageway 102. A trolley operating area 103 which has to remain clear to allow unhindered trolley handling is designated with the reference numeral 103. An assist space 104 extends over a part of the length of the aircraft monument 10 in the direction of the passageway 102 between the front surface 30 of the aircraft monument 10 and the passageway 102. Further, the assist space 104 is arranged between an aircraft door 106 and the cabin attendant seat 18 when the cabin attendant seat 18 is disposed in its operating position. The dashed lines in FIG. 9 indicate the contour of the cabin attendant seat 18, when the seat element 42 is in its unfolded position.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft monument comprising:
   a first compartment,
   a cabin attendant seat having a backrest and a seat element, said seat element being movable relative to the backrest between a folded position, wherein a seat surface of the seat element extends substantially parallel to a backrest surface of the backrest, and an unfolded position, wherein the seat surface of the seat element extends substantially perpendicular to the backrest surface of the backrest,
   said cabin attendant seat being movable relative to the aircraft monument between a cabin attendant seat stowed position, wherein the cabin attendant seat, with the seat element being in the folded position, is received in the first compartment of the aircraft monument, and a cabin attendant seat operating position, wherein the cabin attendant seat is disposed outside of the first compartment of the aircraft monument in a position which allows the seat element to be moved into its unfolded position,
   a neck rest which is movable relative to the aircraft monument between a retracted neck rest stowed position, wherein the neck rest is received in a second compartment of the aircraft monument, and an extended neck rest operating position, wherein the neck rest is disposed outside of the second compartment of the aircraft monument in a position wherein a neck rest surface of the neck rest and the backrest surface of the backrest of the cabin attendant seat being positioned in the cabin attendant seat operating position, extend substantially co-planar,
   a sliding mechanism allowing the neck rest, upon being moved between the retracted neck rest stowed position and the extended neck rest operating position, to be slid into and out of the second compartment, and
   a pivoting mechanism allowing the neck rest, only upon being moved between the retracted neck rest stowed position in the second compartment and the extended neck rest operating position by the sliding mechanism, to be pivoted relative to the aircraft monument.

2. An aircraft monument comprising:
   a first compartment,
   a cabin attendant seat having a backrest and a seat element, said seat element being movable relative to the backrest between a folded position, wherein a seat surface of the seat element extends substantially parallel to a backrest surface of the backrest, and an unfolded position, wherein the seat surface of the seat element extends substantially perpendicular to the backrest surface of the backrest,
   said cabin attendant seat being movable relative to the aircraft monument between a stowed position, wherein the cabin attendant seat, with the seat element being in its folded position, is received in the first compartment of the aircraft monument, and an operating position, wherein the cabin attendant seat is disposed outside of the first compartment of the aircraft monument in a position which allows the seat element to be moved into its unfolded position,
   a first pivoting mechanism allowing the cabin attendant seat, upon being moved between its stowed position and its operating position, to be pivoted relative to the aircraft monument, and
   a first sliding mechanism allowing the cabin attendant seat, upon being moved between its stowed position and its operating position, to be slid out of the first compartment or into the first compartment.

3. The aircraft monument according to claim 2, wherein the cabin attendant seat, when being positioned in its operating position, is connected to the aircraft monument in a load transmitting manner.

4. The aircraft monument according to claim 3, wherein a pivoting axis about which the cabin attendant seat is pivotable, upon the seat being moved between the seat's stowed position and its operating position, extends in one of a region of a side surface, and in the region of an upper surface, of the backrest of the cabin attendant seat.

5. The aircraft monument according to claim 3, wherein, when the cabin attendant seat is disposed in its operating position, the backrest surface of the backrest extends substantially parallel to a front surface of the aircraft monument.

6. The aircraft monument according to claim 3, further comprising a locking mechanism for locking the cabin attendant seat in its operating position, the locking mechanism comprising a first locking element which is provided on the cabin attendant seat and a second locking element which is formed complementary to the first locking element and which is provided in the region of a side surface or in the region of the front surface of the aircraft monument.

7. The aircraft monument according to claim 3, further comprising:
   a second compartment, and
   a neck rest which is movable relative to the aircraft monument between a stowed position, wherein the neck rest is received in the second compartment of the aircraft monument, and an operating position, wherein the neck rest is disposed outside of the second compartment of the aircraft monument in a position wherein a neck rest surface of the neck rest and the backrest surface of the backrest of the cabin attendant seat being positioned in its operating position, extend substantially co-planar.

8. The aircraft monument according to claim 7, further comprising a second sliding mechanism allowing the neck rest, upon being moved between its stowed position and its operating position, to be slid into and out of the second compartment.

9. The aircraft monument according to claim 7, further comprising a second pivoting mechanism allowing the neck rest, upon being moved between its stowed position and its operating position, to be pivoted relative to the aircraft monument.

10. The aircraft monument according to claim 9, wherein a pivoting axis about which the neck rest is pivotable, upon being moved between its stowed position and its operating position, extends in a region of a lower surface of the neck rest.

11. The aircraft monument according to claim 7, wherein, when the neck rest is disposed in its operating position, the neck rest surface of the neck rest extends substantially parallel to the front surface of the aircraft monument.

12. The aircraft monument according to claim 3, wherein an additional backrest cushioning is provided in a region of the front surface of the aircraft monument so as to provide for an enlargement of the backrest surface of the cabin attendant seat, when the cabin attendant seat is disposed in its operating position.

13. The aircraft monument according to claim 7, further comprising a restraint system which is fastened to the aircraft monument, wherein the restraint system at least partially is received in the first or the second compartment when the cabin attendant seat or the neck rest is disposed in its stowed position, and wherein the restraint system is exposed when the cabin attendant seat or the neck rest is moved into the operating position.

14. An aircraft area comprising:
a passageway,
an aircraft monument comprising:
  a first compartment,
  a cabin attendant seat having a backrest and a seat element, said seat element being movable relative to the backrest between a folded position, wherein a seat surface of the seat element extends substantially parallel to a backrest surface of the backrest, and an unfolded position, wherein the seat surface of the seat element extends substantially perpendicular to the backrest surface of the backrest,
  said cabin attendant seat being movable relative to the aircraft monument between a stowed position, wherein the cabin attendant seat, with the seat element being in its folded position, is received in the first compartment of the aircraft monument, and an operating position, wherein the cabin attendant seat is disposed outside of the first compartment of the aircraft monument in a position which allows the seat element to be moved into its unfolded position, and
  a first pivoting mechanism allowing the cabin attendant seat, upon being moved between its stowed position and its operating position, to be pivoted relative to the aircraft monument, and
  a first sliding mechanism allowing the cabin attendant seat, upon being moved between its stowed position and its operating position, to be slid out of the first compartment or into the first compartment,
wherein a front surface of the aircraft monument faces the passageway, and
wherein an assist space extends over a part of a length of the aircraft monument in a direction of the passageway between the front surface of the aircraft monument and the passageway.

* * * * *